Aug. 18, 1959   E. H. THOMPSON   2,899,885
COFFEE BREWER
Filed Oct. 1, 1956   8 Sheets-Sheet 4

INVENTOR.
Ernest H. Thompson
BY
Bair, Freeman & Molinare
ATTORNEYS

Aug. 18, 1959 E. H. THOMPSON 2,899,885
COFFEE BREWER
Filed Oct. 1, 1956 8 Sheets-Sheet 5

INVENTOR.
Ernest H. Thompson
BY
Bair, Freeman & Molinare
ATTORNEYS

INVENTOR.
Ernest H. Thompson
BY
Bair, Freeman & Molinare
ATTORNEYS

Aug. 18, 1959  E. H. THOMPSON  2,899,885
COFFEE BREWER

Filed Oct. 1, 1956  8 Sheets-Sheet 8

INVENTOR.
Ernest H. Thompson
BY
Bair, Freeman & Molinare
ATTORNEYS ical sectional view on the line 9—9 of
United States Patent Office 2,899,885
Patented Aug. 18, 1959

2,899,885

COFFEE BREWER

Ernest H. Thompson, Evanston, Ill.

Application October 1, 1956, Serial No. 613,029

8 Claims. (Cl. 99—289)

This invention relates in general to a machine for brewing coffee which machine is adaptable for push button or coin controlled initiation whereupon various operations necessary for brewing a cup of coffee are automatically performed; or for the performance of such operations manually.

One object of the invention is to provide a machine which will brew coffee when supplied with heated water and ground coffee as distinguished from those types of machines which merely mix hot water and powdered coffee.

Another object is to provide a coffee brewing machine which will brew a cup of liquid coffee when supplied with hot water and ground coffee (and may dispose of the grounds after brewing) all within a comparatively short cycle, for instance 10 seconds.

A more specific object is to provide a machine which has a brew chamber adapted to receive ground coffee and hot water, a fine filter such as a fine mesh screen constituting the bottom of the chamber, and means being provided to prevent clogging of the filter when water is supplied at atmospheric pressure as distinguished from vacuum type brewers which, because of the pressure differential between the vacuumized chamber below the filter and the ground coffee chamber above it (at atmospheric pressure) effects forcing of the liquid coffee through the grounds and the filter without the necessity of a means to keep the filter from clogging.

Still another object is to provide mechanical wiper means for the filter to facilitate quick soaking of the coffee grounds and prevent the clogging of the filter to thereby permit effective gravity feed of water through the grounds that are deposited on the filter within the brew chamber and discharge of the resulting liquid coffee into a cup or other receptacle in a shorter period of time than is possible with a vacuum type coffee brewer.

A further object is to provide a brew chamber which is automatically movable from a position over the filter to a position for discharge of the coffee grounds therefrom and return to its initial position during a cycle of operation of the machine.

Still a further object is to provide a motor-driven filter wiping means which is automatically operated at least during the coffee brewing part of the operating cycle of the machine.

An additional object is to provide timing mechanism operable to control the flow of hot water to the brewing chamber and the discharge of ground coffee thereinto as well as the shifting of the brew chamber from the brewing position to the coffee ground discharge position and return, with means (preferably electrically operated) for accomplishing the various steps of the cycle in the desired order and for the desired period of the time as determined by the timing mechanism.

Another additional object is to provide means for heating the brew chamber if required, as when the machine is located in an unheated room during the winter time, so that the water and liquid coffee are not reduced in temperature by contact with the brew chamber during the brewing operation.

Still another additional object is to provide a readily removable filter and wiping unit, a readily removable brew chamber and a readily removable magazine for ground coffee which permits ease of cleaning the various parts of the machine by a service man and likewise ease of replenishing the supply of ground coffee to keep the machine in operation.

A further additional object is to provide a modification of the coffee brewing machine in which the filter wiper moves with the brew chamber from the brewing position to the coffee ground discharge position and includes a wiper for the interior of the brew chamber for more effectively discharging the coffee grounds therefrom and also cleaning a plate along which the brew chamber slides.

Still a further additional object is to provide a second modification adaptable for less automatic operation and resulting in a simpler machine similar to a "malted milk mixer" which may be manually charged with hot water and coffee grounds and utilizes the motor usually provided for mixing drinks to rotate a filter and brew chamber wiper.

With these and other objects in view, my invention consists in the construction, arrangement and combination of the various parts of my coffee brewer, whereby the objects above contemplated are attained, as hereinafter more fully set forth, pointed out in my claims and illustrated in detail on the accompanying drawings, wherein:

On the accompanying drawings I have used the reference numeral 25 to indicate a water tank (see Fig. 5) which is housed in a housing 27 that serves as a support for the mechanism of my coffee brewer as will hereinafter appear. Suitably supported in the housing 27 is a water tank casing 24 with insulation 26 packed around the water tank in the casing to prevent undesirable loss of heat from the water in the tank 25 which is heated by a heating element HE surrounding the same.

Figure 1:
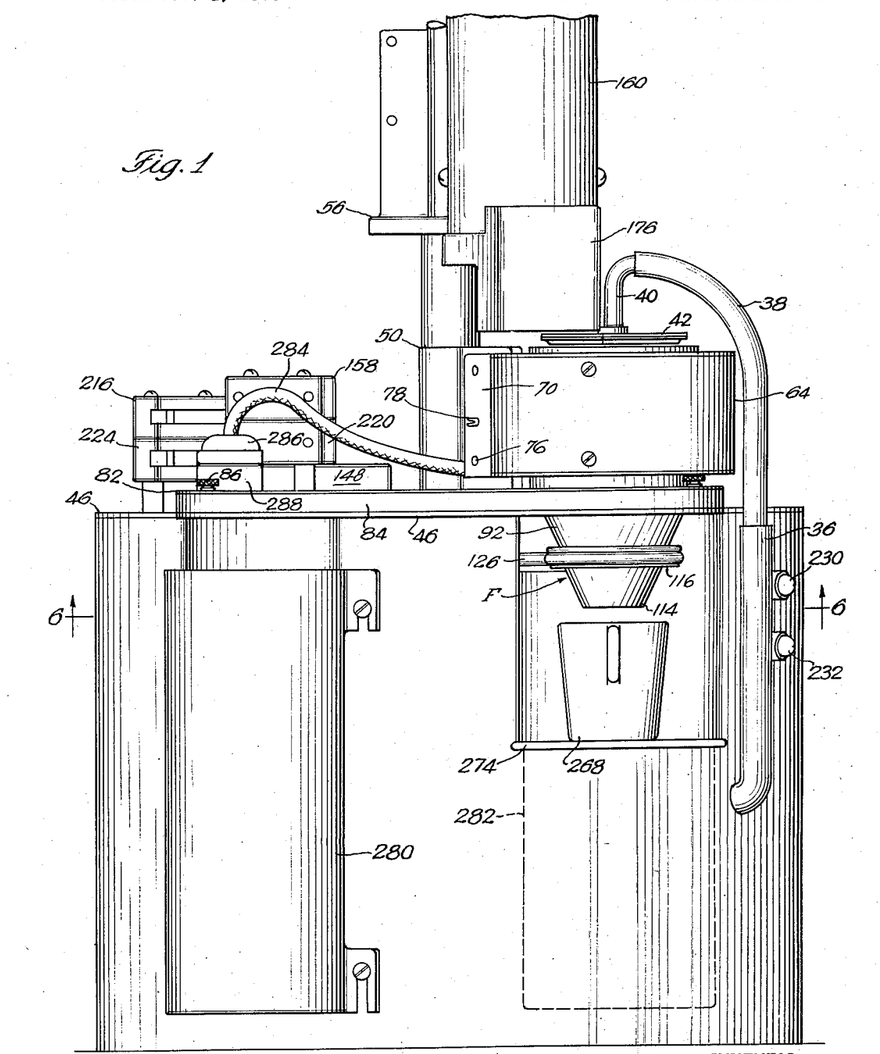
Fig. 1 is a front elevation of a coffee brewing machine embodying my invention, a housing for the upper portion of the machine being omitted in order to show details of construction.
Figure 8:
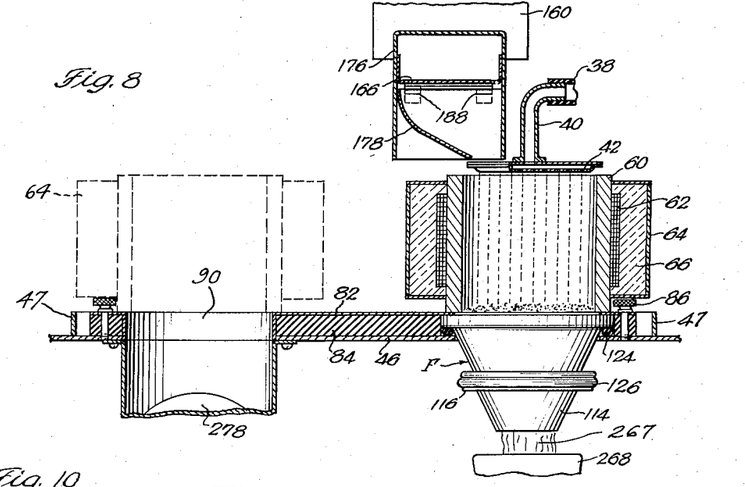
Fig. 8 is a vertical circumferential sectional view on the line 8—8 of Fig. 2, through the brewing chamber and the coffee ground discharge chute showing coffee being brewed.
Figure 14:
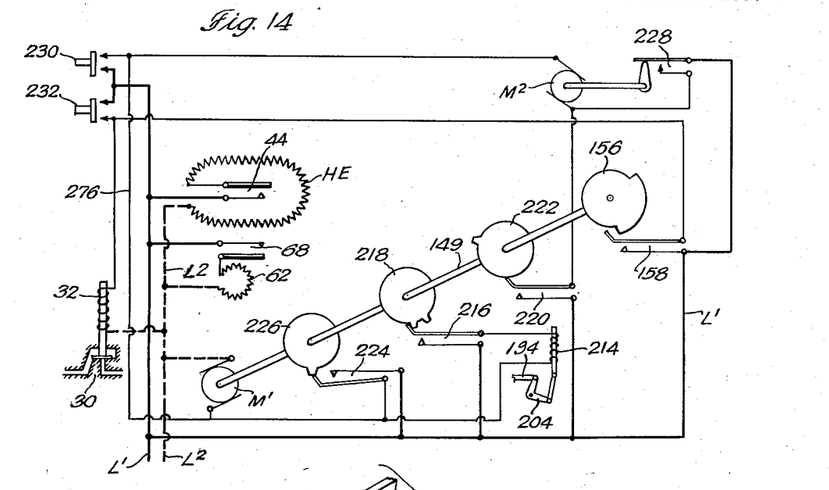
Fig. 14 is an electro-diagrammatic view of the timing switches and electrically operated instrumentalities of my coffee brewing machine.

A water supply pipe 28 is shown which may be connected with the usual city water supply and it extends to a water valve 30 which is electrically operated as by a water valve solenoid 32. A pipe 34 extends from the water valve 30 to the tank 25 and an outlet pipe 36 extends therefrom to the exterior of the housing 27 as shown in Fig. 1 where it is connected by a hose 38 with a tube 40 that terminates in a water spreader plate 42. This plate is perforated as shown in Fig. 8 to supply the water in "sprinkling" fashion during the coffee brewing operation. The temperature of the water in the tank 25 is preferably automatically controlled as by a thermostat 44 in the circuit of the heating element as illustrated in Fig. 14.

Returning to Fig. 5 a top plate 46 is provided on the housing 22 and serves as a support for much of the mechanism of my coffee brewer. A stationary post 48 has a flange 49 secured to the top plate 46 and extends upwardly therefrom. A brew chamber supporting hub 50 is oscillatable thereon. Above the hub 50 a tube 52 is secured to the post 48 as by a pin 54 and a horizontal, channel-shaped supporting plate 56 is secured to the tube 52. A bracket 58 for the water spreader plate 42 is secured to a depending flange of the plate 56.

Figure 5:
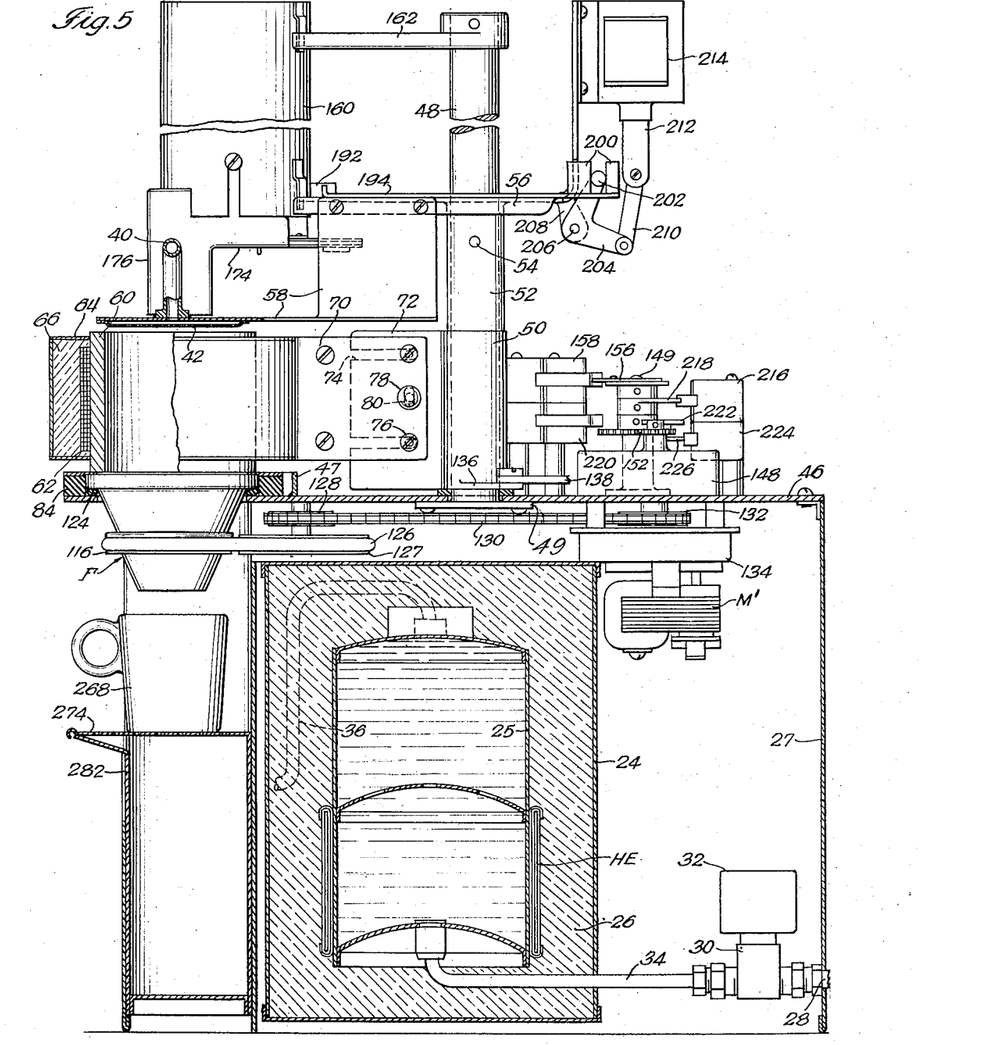
Fig. 5 is a vertical sectional view on the line 5—5 of Fig. 2.
Figure 15:
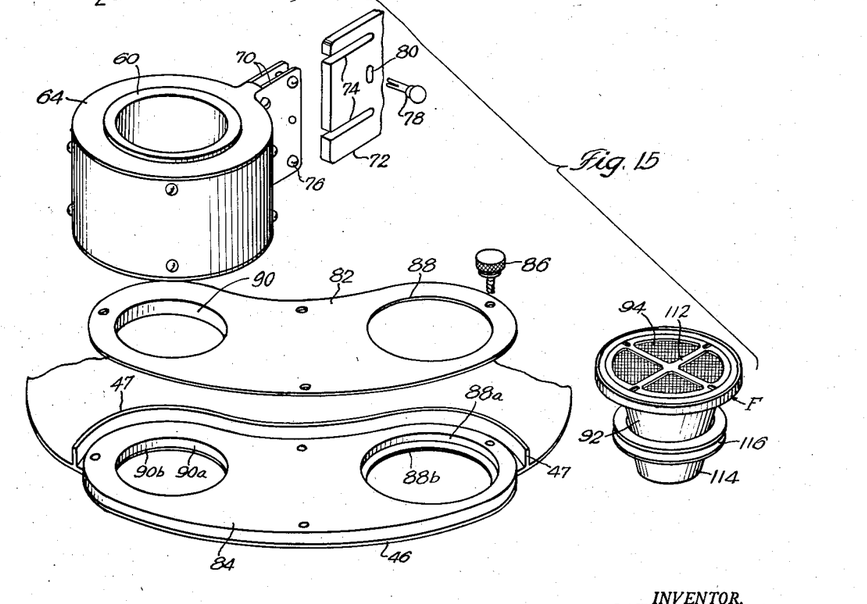
Fig. 15 is an exploded perspective view of a portion of the machine that is adapted to receive the filter and filter wiper unit, showing this unit and the cover plate therefor as well as the removable brew chamber.

Referring to Fig. 5 a brew chamber 60 in the form of a thick metal cylinder is provided around which there is a heating element 62 enclosed in a casing 64, insulation 66 being provided for conserving heat. The temperature of the heating element 62 may also be controlled, as by a thermostat 68 (see Fig. 14). The casing 64 is supported by an arm 70 in the form of a pair of spaced plates as shown in Fig. 15 which coact with a flange 72 of the brew chamber supporting hub 50. Slots 74 are provided in the flange 72 to receive bolts 76 of the arm 70 and the slots are somewhat wider than the diameter of the bolts to permit a desirable floating mount of the brew chamber 60 relative to the hub 50 for a purpose which will hereinafter appear. This arrangement permits ready disassociation of the brew chamber relative to the flange 72 and reassociation thereof whereupon a removable pin 78 may be inserted through openings of the arm 70 and through a slot 80 of the flange 72 which thus provides an operative connection without interfering with the floating action just referred to. The pin 78 is preferably a friction fit in its openings.

The brew chamber 60 is adapted to be oscillated on an arcuate plate 82 which is removably supported on a filler plate 84 secured to the top surface of the top plate 46. Four knurled-head screws 86 are provided for this purpose which are threaded into the filler plate 84. The plate 82 is provided with a brew opening 88 and a ground coffee discharge opening 90, the plates 84 and 46 being provided with similar openings 90a, 90b, 88a and 88b.

Figures 11, 12, 13, 21, 22, 23:
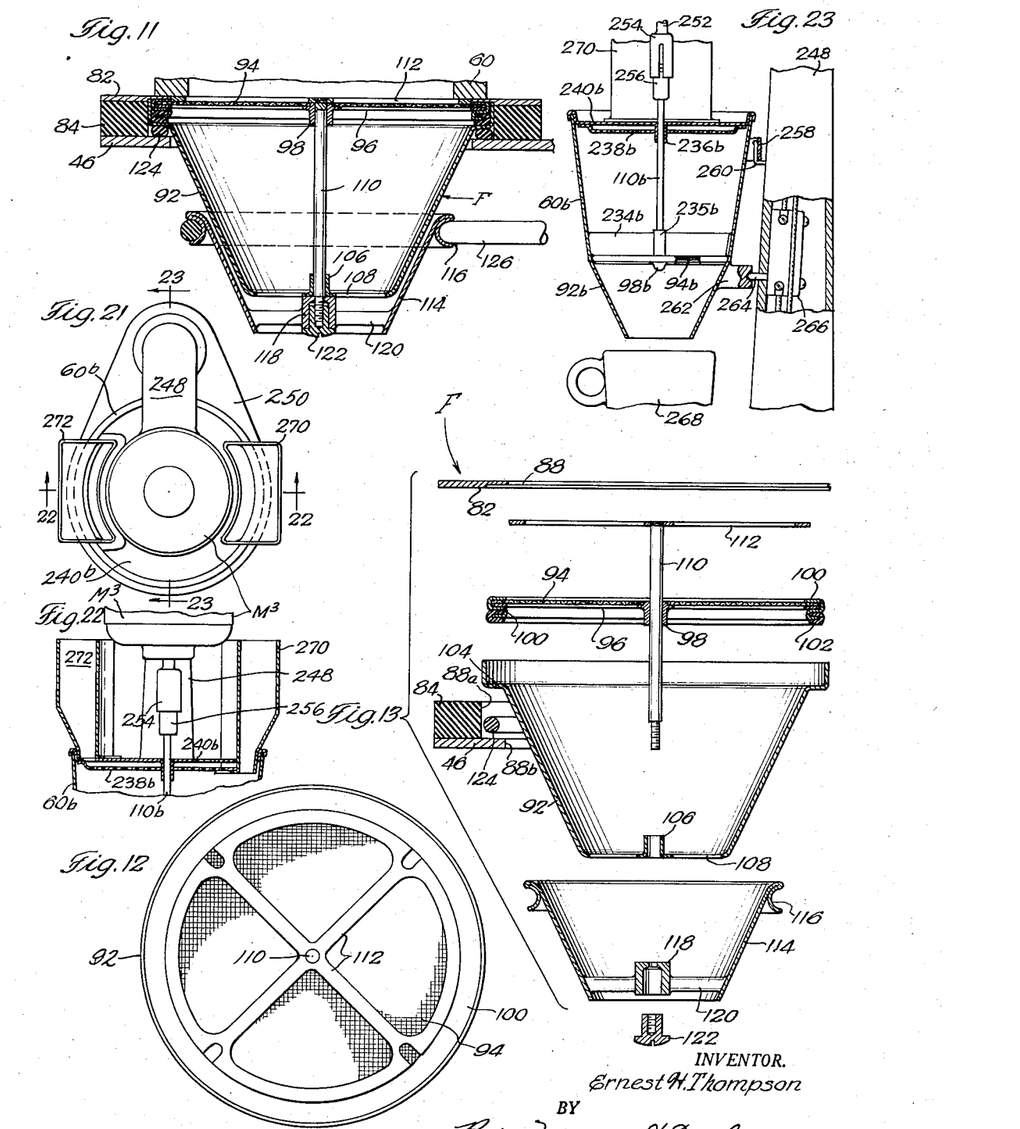
Fig. 11 is an enlarged vertical sectional view through a filter and filter wiping unit.
Fig. 12 is a plan view of Fig. 11.
Fig. 13 is an exploded sectional view of the parts of the filter and filter wiper unit.
Fig. 21 on Sheet 6 is a plan view of another modified form of the invention.
Fig. 22 is a vertical sectional view thereof on the line 22—22 of Fig. 21.
Fig. 23 is a vertical sectional view on the line 23—23 of Fig. 21.

I provide a removable filter and filter wiper unit F shown in Fig. 15 which is shown in detail in Figs. 11, 12 and 13. This unit comprises a truncated cone 92 formed of sheet metal having a bearing 106 and liquid coffee discharge openings 108 at its lower end. A filter 94 in the form of an extremely fine mesh screen disc suitable for use in "vacuum" types of coffee makers is provided which rests on a supporting spider 96 and the two are held assembled in a sheet metal rim 100 with which a channel-shaped seal washer of neoprene or the like 102 is associated which rests against a shoulder 104 of the cone 92. The spider 96 has a bearing 98 at its center.

A shaft 110 extends rotatably through the bearings 98 and 106 and has a disc-like filter wiper 112 on its upper end which as shown in Fig. 12 may comprise a rim and a number of spokes. The supporting spider 96 may be of similar construction to the wiper 112 although somewhat larger in size as the rim of the wiper fits inside the sheet metal rim 100 as shown in Fig. 11.

On the lower end of the shaft 110 I provide a pulley comprising a pulley cone 114 and a belt receiving annular channel 116 connected with a hub 118 by spokes 120. The hub 118 is secured to the shaft 110 as by a retainer nut 122.

The filter and filter wiper unit F just described cooperates with the top plate 46 and its opening 88b, the filler plate 84 and its opening 88a and the arcuate plate 82 and its opening 88 as shown in Fig. 11 with a seal ring 124 interposed between the shoulder 104 and the top plate 46 surrounding the opening 88b as also shown in Fig. 13. The filter wiper 112 is adapted to be rotated by a belt 126 in the channel 116 as will hereinafter appear.

As shown in Fig. 5, the belt 126 is driven from a pulley 127 which is on a shaft with a sprocket 128. A chain 130 extends from the sprocket 128 to a sprocket 132 on the low speed shaft of a gear reducer 134. The high speed shaft of the reducer is driven by an electric motor $M^1$. The elements just described are mounted on the under surface of the top plate 46.

Figures 2, 3, 4:
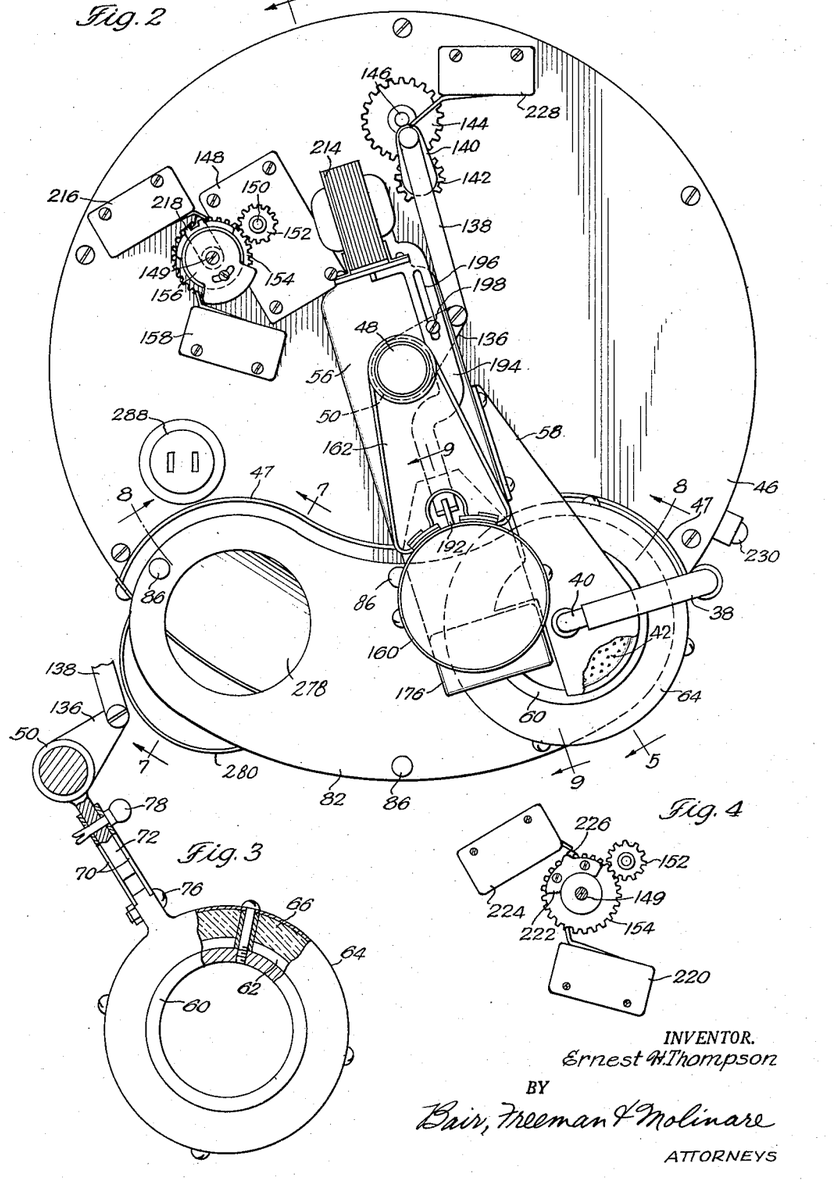
Fig. 2 is a plan view of the machine shown in Fig. 1.
Fig. 3 is a plan view partly in section and shows the brew chamber per se.
Fig. 4 is a plan view of two additional timing switches located below two that are shown in Fig. 2 to show their relation to the timing cam.

As shown in Fig. 2, the hub 50 to which the brew chamber 60 is secured has an arm 136 from which a connecting link 138 extends to the crank pin of a crank 140. The crank 140 is rotated from a shaft 146 by a gear 144 and a pinion 142, and the shaft 146 in turn is rotated by a motor $M^2$ (see Fig. 6) having a suitable gear reducer 135 similar to that shown at 134 in Fig. 5. The motor $M^2$ may be considered a brew chamber motor whereas the motor $M^1$ is a filter wiper and timing motor.

The slow speed shaft of the gear reducer 134 which drives the sprocket 132 also drives a further gear reducer 148 (see Fig. 5) and thereby a timing shaft 150 at a further reduced rate of speed. By means of a pinion 152 and a gear 154 a cam shaft 149 is driven at about 6 r.p.m. A water valve cam 156 is mounted on the cam shaft 149 and operates a water valve switch 158 in the circuit of the solenoid 32 of the water valve 30 as shown in the electric diagram, Fig. 14.

Figure 9:
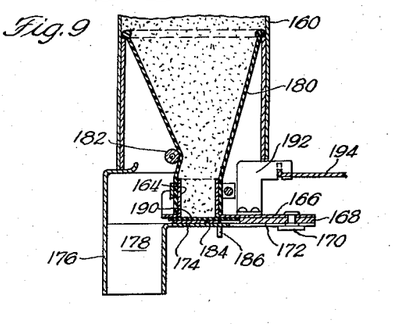
Fig. 9 is a vertical sectional view on the line 9—9 of Fig. 2 showing a ground coffee charge forming means in the normal position.
Figure 10:
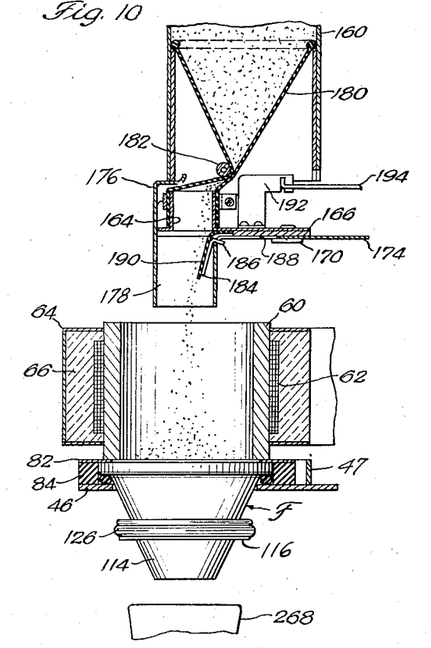
Fig. 10 is a similar view showing it in the discharging position in relation to the brewing chamber which in this figure is shown in section.

In Figs. 2 and 5 I show a magazine tube 160 adapted to receive ground coffee and dispense the same somewhat in the manner described for powdered coffee in my Patent 2,660,340. Details of the dispensing mechanism is shown in Figs. 8, 9 and 10. The magazine tube may be removably supported on the horizontal supporting plate 56 and a supporting arm 162 secured to the upper end of the post 48 as shown in Fig. 5. As shown in Fig. 9, there is a charge forming pocket 164 carried by a slide plate 166 which is mounted against a filler plate 168 by a shoulder rivet 170. The shouldered portion of the rivet is adapted to slide in a slot 172 of a supporting plate 174 which is part of a charge receiving housing having therein a deflector 178 as shown in Fig. 8.

A neoprene funnel 180 is located in the magazine tube 160 and is adapted to coact with a roller 182 as will hereinafter appear during the charge forming operation. A discharge flap 184 has a pair of actuating flanges 186 slidable in slots 188 of the supporting plate 174 (see Figs. 8, 9 and 10) and a neoprene flap 190 overlies the flap 184 and serves as a hinge therefor when the discharge flap 184 is swung from the charge forming pocket closure position of Fig. 9 to the discharge position of Fig. 10 as fully disclosed in my above-mentioned patent.

An actuating bracket 192 is secured to the slide plate 166 and connects with a slide plate 194 which as shown in Fig. 2 slides on the horizontal supporting plate 56 and is limited as to its sliding movement relative thereto by a slot 196 and a shouldered screw 198. The slide plate 194 as shown in Fig. 5 has a pair of arms 200 forming a slot for a projection 202 on a bell crank 204. The bell crank is pivoted at 206 to a bracket 208 of the supporting plate 56 and is operatively connected by a link 210 with a magnetic core 212 slidable into a coffee dispensing solenoid coil 214. In Fig. 2, a coffee dispensing solenoid switch for the coil 214 is shown at 216 to be actuated by a cam 218, and the circuit therefor is shown in Fig. 14.

In Fig. 4 I show a brew chamber switch 220 to be actuated by a brew chamber switch cam 222 on the cam shaft 149 and a full stroke switch 224 for the brew chamber adapted to be actuated by a cam 226. The switch 224 insures one revolution of the timing cam shaft 149. The switches 220 and 224 are located directly below the switches 158 and 218 respectively as shown in Fig. 5.

There is another full stroke switch for the brew chamber operating crank 140 shown in Fig. 2 at 228. Fig. 14 shows the circuits for the switches 220, 224 and 228. Also, I provide a brewing cycle initiating push button 230 and a hot water push button 232 connected in the electric circuit as shown in Fig. 14.

The modified form of invention shown in Figs. 16 to 20 has many of the elements found in the previous figures and these have been referred to by the same reference numerals with the addition of the distinguishing characteristic $a$. The differences are as follows:

Instead of the filter wiper 112a being part of a unit with the cone 92a and associated parts, it is part of the brew chamber and moves with it from the solid line position over the filter 94a to the dotted line position over the ground coffee discharge opening 90a, thus aiding in keeping the upper surface of the arcuate plate 82a clean and facilitating the discharge of the wet coffee grounds after the brewing operation particularly by reason of additional brew chamber wiper blades 234 which wipe the internal surface of the brew chamber 60a. The blades 234 are secured to a hub 235 and are wide enough to reach a point well above the level of the grounds in the brew chamber during a brewing operation. They may be spring blades to secure a good wiping action. The shaft 110a is carried in a sleeve-like bearing 236 secured to the top of the brew chamber 60a and reinforced by a perforated plate 238 which cooperates with the top of the top wall 240 to form a water spreader similar to the plate 42 shown in Figs. 2 and 5.

Figure 16:
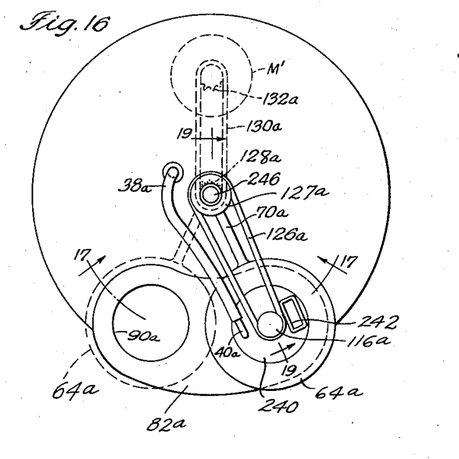
Fig. 16 is a plan view of a modified form of my invention.
Figure 17:
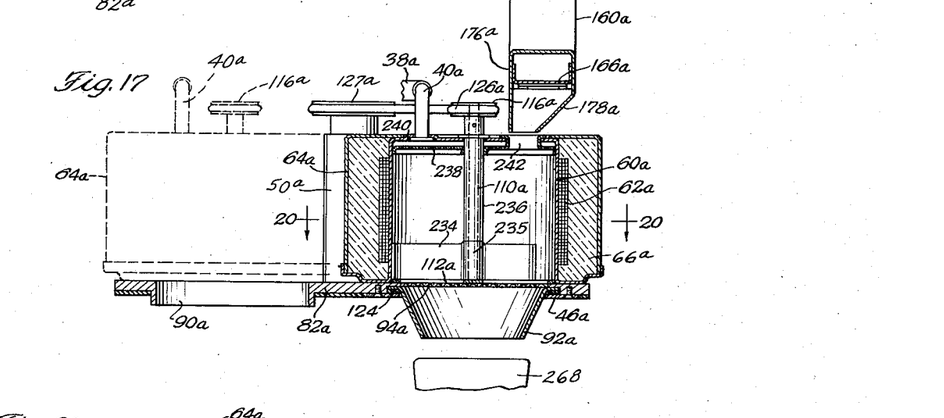
Fig. 17 is a vertical sectional view thereof on the line 17—17 of Fig. 16.
Figure 18:
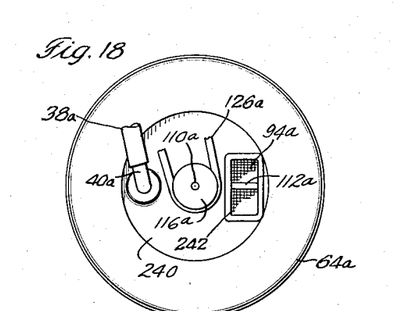
Fig. 18 is a plan view of only the brew chamber shown in Fig. 17.
Figure 19:
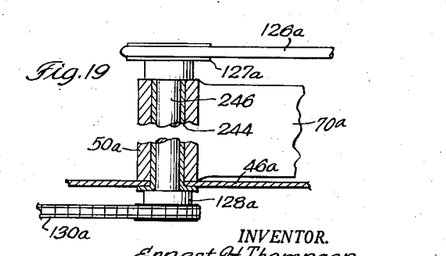
Fig. 19 is a vertical sectional view on the line 19—19 of Fig. 16.
Figure 20:
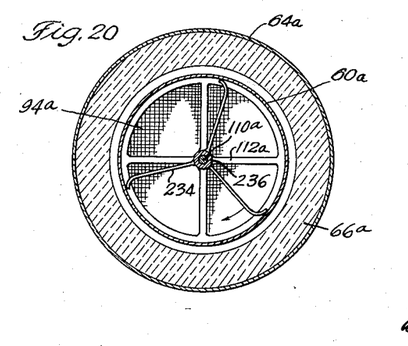
Fig. 20 is a horizontal sectional view on the line 20—20 of Fig. 17.

The water tube 40a is carried by the top wall 240 and the hose 38a permits swinging of the brew chamber 60a from the solid line position of Figs. 16 and 17 to the dotted line position. The hose may extend from a point near the axis of oscillation of the brew chamber as shown in Fig. 16.

To permit entrance of the coffee grounds discharged from the charge receiving housing 176a and the deflector 178a, I provide an opening 242 through the water chamber 238—240. In order to transmit rotation to the shaft 110, the arrangement shown in Figs. 16 and 19 may be used comprising a sleeve 244 extending upwardly from the top plate 46a and having a shaft 246 rotatable therein for driving the pulley 127a from the sprocket 128a.

My device can also be made relatively simple but will require more manual attention if designed somewhat similar to a "drink mixer" as shown in Figs. 21, 22 and 23 (Sheet 6). Parts similar to the preceding figures are numbered similarly with the addition of the distinguishing characteristic $b$. Over and above the parts thus numbered a motor $M^3$ is shown at the top of a post 248 extending upwardly from a base 250 similar to a malted milk mixer. A shaft 252 is shown which rotates at preferably a step down ratio relative to the usual electric motor and has a clutch coupling 254 on its lower end as shown in Fig. 23 to coact with a mating clutch coupling 256 on the upper end of the filter wiper shaft 110b.

The brew chamber 60b is adapted to be removably mounted on the post 248 as by a mounting clip 258 coacting with a tongue 260 projecting from the post and a boss 262 adapted to coact with a pin 264. The pin 264 may be an actuating pin of a switch 266 for the motor $M^3$ so that the motor is energized whenever the brew chamber 60b is in the mounted position shown over a cup 268.

The top wall 240b of the brew chamber 60b has a chute 270 to receive a measured charge of ground coffee placed manually therein and a funnel 272 to receive a measured quantity of hot water at a desired temperature also placed manually therein. The complete operation will be described hereinafter.

*Practical operation of Figs. 1 through 15*

In the operation of my coffee brewing machine, a suitable cup 268 may be placed on a platform 274 beneath the cones 92 and 114 as shown in Fig. 1 and the push button 230 depressed for a few moments to initiate the brewing cycle. In place of the push button 230 a coin controlled mechanism such as shown in my Patent No. 2,660,351 may be provided for initiating the brewing and dispensing cycle by the deposit of a coin of given denomination.

Referring to Fig. 14, it will be obvious that closure of the push button 230 will establish a circuit from line wire L1 through a wire 276 to the motor $M^1$ and back to line wire L2, thus energizing the motor $M^1$ for rotating the cam shaft 149 and also operating the filter wiper 112 which is driven by the motor $M^1$. As soon as the cam shaft 149 starts to rotate, switch 224 (which shunts the push button 230) will close for keeping the motor $M^1$ energized throughout a full revolution of the cam shaft 149 and will stop the rotation thereof when the switch 224 again opens.

Immediately after the cam shaft 149 starts to rotate, the cam 218 will close the dispensing solenoid switch 216 for dispensing two shots of ground coffee into the brew chamber 60 at the left side of the water spreader plate 42 which is cut away to provide an opening for this purpose as shown in Fig. 2. I have found it necessary in order to quickly brew liquid coffee from hot water and ground coffee, to get the coffee wet quickly and it is, therefore, desirable to dispense half the required amount of coffee in one shot and then a second shot soon thereafter which I accomplish by having two cam lobes close together on the cam 218. At the same time it is desirable to have the water enter immediately and therefore the water valve cam 156 also closes the water valve switch 158 soon after the cam shaft 149 starts to rotate. By having but small volume above the spreader plate 42, I get some build-up of pressure to squirt the water out of the many perforations of the spreader plate 42 under the pressure of city water introduced at the pipe 28 and through the water tank 25 when the water valve 30 is opened. It will be noted that the lobe of the cam 156 is of considerable length so as to keep the water valve open about one-third of the complete operating cycle which is sufficient to discharge the desired quantity of water over the desired period of time for quickly wetting the coffee grounds and extracting the flavor therefrom to result in the flow of liquid coffee 267 into the cup 268 as shown in Fig. 8 wherein the ground coffee has been deposited in the brew chamber 60 and the water is flowing therein.

Fig. 9 illustrates the initial position of the ground coffee dispenser and Fig. 10 the operated position thereof with the discharge flaps 184 and 190 in the discharge position in Fig. 10 just prior to introduction of the water as in Fig. 8. During the brewing operation the filter wiper 112 passes across the face of the filter screen 94 for preventing clogging of the filter and I find this arrangement superior to attempting to agitate the ground coffee and water at some point above the filter, the wiper 112 working against the surface of the filter for positively moving the coffee grounds out of clogging position relative to the interstices of the screen 94 any time they tend to cause clogging. Accordingly the liquid coffee 267 quickly flows through the filter screen at atmospheric pressure and without the necessity of providing a vacuum therebelow to pull the liquid coffee through due to atmospheric pressure on top as is the usual procedure.

Figures 6, 7:
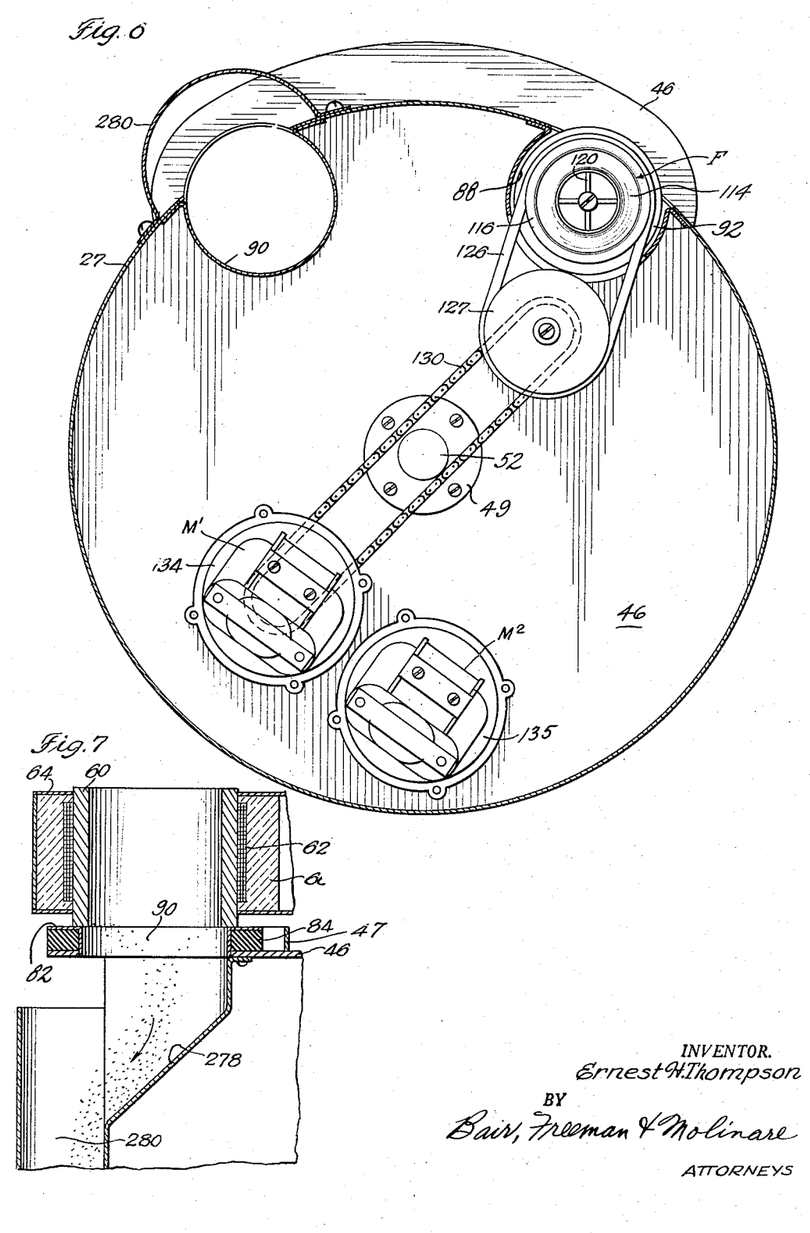
Fig. 6 is a sectional view on the line 6—6 of Fig. 1 and shows the under surface of the top plate of the machine.
Fig. 7 is a detail sectional view on the line 7—7 of Fig. 2 to show the brewing chamber dumping the coffee grounds therefrom.

After the water valve has closed by opening of the switch 158 the brew chamber switch 220 closes under the action of the cam 222 and initiates energization of the motor M² which, after it rotates a few turns, permits the full stroke switch 228 to close so that the switch 220 which it shunts can be opened and the crank 140 will rotate through a full revolution before again opening the switch 228. During one-half of this revolution it swings the brew chamber 60 from over the opening 88 of the arcuate plate 82 to a position over the opening 90 (from the full line position of Fig. 8 to the dotted line position thereof) and the wet coffee grounds are discharged through the opening 90 of Fig. 8 and deflected by a deflector 278 as shown in Fig. 7 into a coffee ground receiver 280. During the other half of the revolution of the crank 140, the brew chamber is returned from the dotted position of Fig. 8 to the full line position thereof and soon thereafter the full stroke switch 224 reopens so as to stop the entire cycle.

From the operation just described, it will be obvious that I have provided a machine which will produce brewed coffee from coffee grounds, as distinguished from "instant coffee" consisting of powdered coffee and water which are mixed together. By providing a mechanical wiper means for the coffee filter, it is possible to eliminate the necessity of providing a vacuum type of operation and also possible to produce liquid coffee within less than 10 seconds which is not possible with the usual vacuum type of coffee maker.

I have provided a machine which is automatically operated throughout a complete cycle when it is once initiated in operation by depression of the push button 230. If additional hot water is desired in the coffee, this may be secured by depressing the push button 232 which merely establishes a circuit for the water valve solenoid 32 without in any way affecting the operating cycle of the coffee brewing machine.

As shown in Fig. 15 the parts can be readily taken apart for cleaning by a service man (for instance, once a day) and the platform 274 may be perforated and have a water receptacle 282 connected therewith as shown by dotted lines in Fig. 1 for catching any drippings from the cup 268. The coffee ground receiver 280 may be also readily removed and the magazine 160 may be filled while in place or removed as desired, all of which makes the machine readily serviceable and capable of being kept in a sanitary condition. To permit ready removal of the brew chamber unit, it may have a cord 284 for its heating element and a plug 286 thereon to be plugged into an electric outlet 288. The filter and filter wiper unit F as shown in Fig. 5 can be removed as a unit for cleaning and if desired taken apart for further cleaning operations by the removal of the retainer nut 122 whereupon the parts may be disassembled as shown in Fig. 13. The top plate 46 has a flange 47 to catch any water from the plate 46 and direct it into the water receiver 282.

*Practical operation of Figs. 16 through 20*

The arrangement shown in Figs. 16 through 20 permits the use of the wiper 234 for the interior of the brew chamber also so as to make sure that all of the coffee grounds are removed therefrom each cycle of operation instead of the possibility of an undesirable accumulation on the brew chamber wall at the upper level of the coffee grounds.

*Practical operation of Figs. 21, 22 and 23*

The essential portions of my mechanism for quickly brewing ground coffee are also adaptable for the simple type of apparatus shown in Figs. 21, 22 and 23 where manual operations for supplying the coffee grounds and hot water are not objectionable whereas the previous figures show fully automatic machines. With the brew chamber 60b in the position shown in Fig. 3 supported on the post 248 the motor M³ is in operation so as to rotate the filter wiper 94b and the brew chamber wiper 234b. The desired quantities of ground coffee and water at the proper temperature are introduced through the chute 270 and the funnel 272 into the brew chamber and in a few seconds the coffee has been brewed and the liquid coffee completely discharged into the cup 268 which sets on the base 250.

After the cup of coffee is removed, the chamber 60b is lifted off the tongue 260 whereupon the top wall 240b may be removed from the chamber, the wet coffee grounds dumped out of the chamber and the parts rinsed so that they are ready for another coffee brewing operation. To begin such operation the chamber is reassociated with the tongue 260, the coupling 256 coacting with the coupling 254 for driving the filter wiper 94b from the motor M³ when the switch 266 closes.

Some changes may be made in the construction and arrangement of the parts of my coffee brewer without departing from the real spirit and purpose of my invention, and it is my intention to cover by my claims any modified forms of structure or use of mechanical equivalents which may reasonably be included within their scope.

I claim as my invention:

1. In a coffee brewing machine, a brew chamber, means for introducing hot water into said brew chamber, means for introducing ground coffee into said brew chamber, a plate for supporting said brew chamber, said plate having a filter screen opening therein and a coffee ground discharge opening therein spaced from said filter screen opening, means for oscillating said brew chamber from a position over said filter screen opening to a position over said coffee ground discharge opening and vice versa, a filter screen in said filter screen opening and forming a bottom for said brew chamber when in position over said filter screen opening, and a wiper for said filter screen rotatably carried by said plate and formed of sheet metal flatwise against said filter to permit said brew chamber to move onto and off said wiper during the oscillations thereof, said filter screen being countersunk in said supporting plate to a depth substantially equal to the thickness of such sheet metal.

2. A coffee brewer brewing machine comprising an arm, a weighted brew chamber loosely carried thereby, means for introducing hot water into said brew chamber, means for introducing ground coffee into said brew chamber, a filter screen forming the bottom of said brew chamber, a wiper for said filter screen, means for moving said wiper across the face of said filter screen, a plate for supporting said brew chamber, said plate having a filter screen opening therein and a coffee ground discharge opening therein spaced from said filter screen opening, said filter screen and wiper being located in said filter screen opening with the upper surface of said wiper substantially flush with the upper surface of said plate, and means for oscillating said arm and thereby moving said brew chamber from a position over said filter screen opening to a position over said coffee ground discharge opening and then returning said brew chamber to a position over said filter screen opening.

3. In a coffee brewer of the character disclosed, a brew chamber comprising a cylinder having open ends, a plate on which said cylinder may slide, means for introducing hot water into said brew chamber, means for introducing ground coffee into said brew chamber, a filter screen forming the bottom of said brew chamber, said plate having an opening in registry with said filter screen and a second opening spaced therefrom, a wiper for said filter screen, means for moving said wiper across the face of said filter screen, and means for sliding said brew chamber on said plate to positions alternately over said two openings of said plate, said brew chamber being loosely mounted on said last means whereby it seeks by gravity a seated position at all times on said plate.

4. A coffee brewing machine comprising a brew chamber, means for introducing hot water into said brew chamber comprising a water tank, a solenoid valve for controlling the flow of water under pressure to said tank, means for introducing ground coffee into said brew chamber comprising a ground coffee magazine and means for discharging a charge of ground coffee therefrom, said last means being electrically operated, a filter screen forming the bottom of said brew chamber, a wiper for said filter screen, means for moving said wiper across the face of said filter screen comprising an electric motor operatively connected therewith, a plate for supporting said brew chamber, said plate having a filter screen opening therein and a coffee ground discharge opening therein spaced from said filter screen opening, means for oscillating said brew chamber from a position over said filter screen opening to a position over said coffee ground discharge opening and then returning said brew chamber to a position over said filter screen opening, said last means being electrically operated, and timing switches for sequentially energizing said solenoid valve, said electric motor and said electrically operated ground coffee and brew chamber oscillating devices.

5. In a coffee brewing machine of the character disclosed, a brew chamber, means for introducing hot water into said brew chamber comprising a water tank, means for heating the water therein and maintaining the same at a substantially constant temperature, a solenoid valve for conrolling the flow of water under pressure to said tank, means for introducing ground coffee into said brew chamber comprising a ground coffee magazine and means for discharging a charge of ground coffee therefrom, said last means being electrically operated, a filter screen forming the bottom of said brew chamber, a wiper for said filter screen, means for moving said wiper across the face of said filter screen comprising an electric motor operatively connected therewith, a plate for supporting said brew chamber, said plate having a filter screen opening therein and a coffee ground discharge opening therein spaced from said filter screen opening, a second electric motor oscillating said brew chamber from a position over said filter screen opening to a position over said coffee ground discharge opening, said last means being electrically operated, and pushbutton means for initiating an operating cycle of the foregoing mechanism which cycle comprises sequentially energizing said first electric motor, energizing said solenoid valve for a predetermined period of time, energizing the electrically operated means for discharging ground coffee into said brew chamber, energizing said second electric motor for moving said brew chamber, and stopping said electric motors.

6. A coffee brewer comprising a brew chamber, means for introducing hot water into said brew chamber, means for introducing ground coffee into said brew chamber, a filter screen forming the bottom of said brew chamber, wipers for said filter screen and for the interior of said brew chamber, means for moving said wipers across the face of said filter screen and over the interior surface of said brew chamber, a plate for supporting said brew chamber, said plate having a filter screen opening therein and a coffee ground discharge opening therein spaced from said filter screen opening, means for sliding said brew chamber from a position over said filter screen opening to a position over said coffee ground discharge opening, and pushbutton means for initiating an operating cycle of the foregoing mechanism, which cycle comprises sequentially operating said wipers, introducing a charge of water and a charge of ground coffee into said brew chamber, moving said brew chamber from a position over said filter screen opening to a position over said coffee ground discharge opening and returning it to a position over said filter screen opening, and stopping said wipers.

7. A coffee brewer comprising an oscillatable, open-bottom brew chamber, means for introducing hot water into said brew chamber comprising a water tank, means for heating the water therein and maintaining the same at a substantially constant temperature, a water chamber for receiving said water and having a perforated water spreader plate located over said brew chamber, means for introducing ground coffee into said brew chamber comprising a ground coffee magazine and means for discharging ground coffee therefrom, a filter screen forming a bottom for said brew chamber when said brew chamber is positioned over said filter screen, a sheet metal wiper for said filter screen and flatwise thereagainst, means for moving said wiper across the face of said filter screen, and means for initiating an operating cycle of the foregoing mechanism, which cycle comprises sequentially operating said wiper, introducing a charge of water and a charge of ground coffee into said brew chamber, oscillating said brew chamber from a position over said filter screen to a position spaced therefrom for discharging coffee grounds from said brew chamber and returning it to a position over said filter screen, and stopping said wiper.

8. In a coffee brewer of the character disclosed, a brew chamber comprising a vertical cylinder having open ends, a plate for supporting said cylinder having two openings therein spaced from each other, said brew chamber being oscillatable across the face of said plate, means for introducing water into said brew chamber comprising a water tank, means for heating the water therein and maintaining the same at a substantially constant temperaure, means for introducing ground coffee into said brew chamber, a filter screen forming the bottom of said brew chamber and located in one of said openings of said plate, a wiper for said filter screen, said wiper being formed of sheet metal arranged flatwise against said filter screen and both the screen and the wiper being countersunk relative to said plate, means for moving said wiper across the face of said filter screen, and means for initiating an operating cycle of the foregoing mechanism, which cycle comprises sequentially operating said wiper, introducing water and ground coffee into said brew chamber, oscillating said brew chamber from a position over said first opening to a position over said second opening and returning it to a position over said first opening, and stopping said wiper.

References Cited in the file of this patent
UNITED STATES PATENTS

| 413,982 | Theurer | Oct. 29, 1889 |
| 612,883 | Van Marter | Oct. 25, 1898 |

(Other references on following page)

UNITED STATES PATENTS

| | | |
|---|---|---|
| 761,828 | Hampton | June 7, 1904 |
| 767,595 | Pike | Aug. 16, 1904 |
| 1,001,778 | Skouge | Aug. 29, 1911 |
| 1,506,712 | McAllen | Aug. 26, 1924 |
| 1,813,872 | Bausman | July 7, 1931 |
| 1,903,519 | Snider | Apr. 11, 1933 |
| 2,014,325 | Grilli | Sept. 10, 1935 |
| 2,203,091 | Hutch | June 4, 1940 |
| 2,315,777 | Denton | Apr. 6, 1943 |
| 2,517,073 | Alvarez | Aug. 1, 1950 |

FOREIGN PATENTS

| | | |
|---|---|---|
| 18,489 | Great Britain | of A.D. 1907 |
| 570,522 | France | Jan. 17, 1924 |